Sept. 2, 1958　　　　F. M. JONES　　　　2,850,001
CONTROL DEVICE FOR INTERNAL COMBUSTION ENGINE
Filed Sept. 14, 1955　　　　　　　　　　9 Sheets-Sheet 1

INVENTOR.
FREDERICK M. JONES
BY
ATTORNEYS

Sept. 2, 1958   F. M. JONES   2,850,001
CONTROL DEVICE FOR INTERNAL COMBUSTION ENGINE
Filed Sept. 14, 1955   9 Sheets-Sheet 2

*INVENTOR.*
FREDERICK M. JONES
BY
Whiteley & Caine
ATTORNEYS

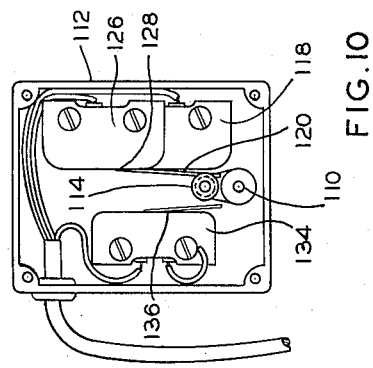
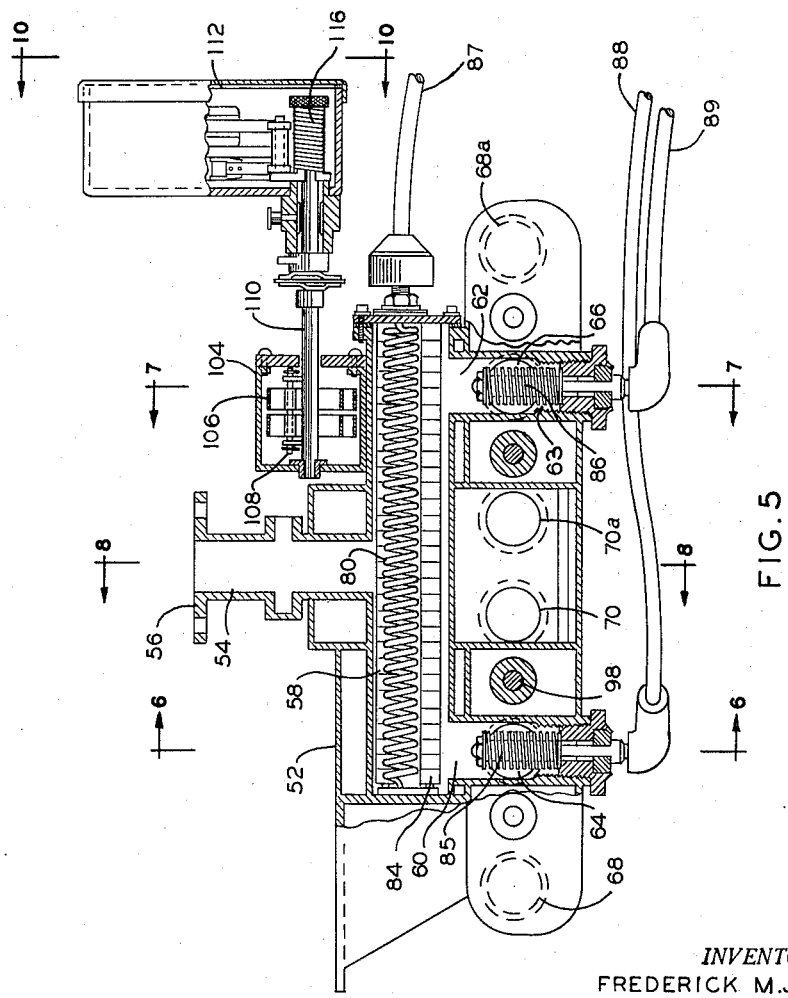

Sept. 2, 1958  F. M. JONES  2,850,001
CONTROL DEVICE FOR INTERNAL COMBUSTION ENGINE
Filed Sept. 14, 1955  9 Sheets-Sheet 4

INVENTOR.
FREDERICK M. JONES
BY *Whiteley & Caine*

ATTORNEYS

Sept. 2, 1958  F. M. JONES  2,850,001
CONTROL DEVICE FOR INTERNAL COMBUSTION ENGINE
Filed Sept. 14, 1955  9 Sheets-Sheet 5

*INVENTOR.*
FREDERICK M. JONES
BY *Whiteley & Caine*
ATTORNEYS

Sept. 2, 1958 F. M. JONES 2,850,001
CONTROL DEVICE FOR INTERNAL COMBUSTION ENGINE
Filed Sept. 14, 1955 9 Sheets-Sheet 6

*INVENTOR.*
FREDERICK M. JONES
BY *Whiteley & Caine*

ATTORNEYS

Sept. 2, 1958   F. M. JONES   2,850,001
CONTROL DEVICE FOR INTERNAL COMBUSTION ENGINE
Filed Sept. 14, 1955   9 Sheets-Sheet 7

INVENTOR.
FREDERICK M. JONES
BY
ATTORNEYS

Sept. 2, 1958  F. M. JONES  2,850,001
CONTROL DEVICE FOR INTERNAL COMBUSTION ENGINE
Filed Sept. 14, 1955  9 Sheets-Sheet 8

INVENTOR.
FREDERICK M. JONES
BY Whiteley & Caine
ATTORNEYS

Sept. 2, 1958   F. M. JONES   2,850,001
CONTROL DEVICE FOR INTERNAL COMBUSTION ENGINE
Filed Sept. 14, 1955   9 Sheets-Sheet 9

*INVENTOR.*
FREDERICK M. JONES
BY
*Whiteley & Caine*
ATTORNEYS

United States Patent Office 2,850,001
Patented Sept. 2, 1958

2,850,001

CONTROL DEVICE FOR INTERNAL COMBUSTION ENGINE

Frederick M. Jones, Minneapolis, Minn., assignor to Thermo King Corporation, Minneapolis, Minn., a corporation of Minnesota Application September 14, 1955, Serial No. 534,224

16 Claims. (Cl. 123—179)

This invention relates to a control device for an internal combustion engine and is used to regulate the vaporization of fuel, and to control the electrical circuits used for the ignition of the fuel and/or starting of the engine.

This application is a continuation in part of my prior application Serial No. 452,629.

In general the present invention is concerned with a control device disposed between the carburetor and the combustion cylinders of an engine to properly pre-heat the fuel to a vaporized condition, and in conjunction therewith to provide a system of initially energizing the ignition system and/or the engine starting motor when the control device is in a condition to provide spontaneous ignition to the fuel-air mixture. The invention is also concerned with means for maintaining the fuel-air mixture flowing to the combustion cylinders at the proper temperature to obtain the maximum efficiency therefrom. Although not limited to any specific form of fluid fuel, the device enables a low compression engine of proper construction to operate on the heavier hydrocarbon fractions by raising the temperature of the fuel-air mixture into the range where the greatest efficiency can be obtained, and also to maintain the engine parts in a clean condition to thereby prolong the useful life of the engine.

It is fully recognized that the principal handicap to starting a cold internal combustion engine, provided the other portions of the engine are in operating condition, is occasioned by the improper vaporization of the fuel. In starting a cold engine it is customary to initially choke the supply of air flowing to the carburetor to compose an extremely rich mixture, which when introduced into the combustion cylinders generally is not completely burned thereby resulting in carbon residues, and also some dilution of the crankcase lubricant. Moreover, even after the engine has been started and is self-operating, if the ambient temperature is very low, both the air-fuel mixture and the engine parts are so cold that only partial combustion occurs. Therefore, when the fuel is only partially vaporized there is not only a loss of power, but also crankcase dilution and the formation of undesirable residues in the cylinders. This is particularly true with respect to engines that are designed to operate with high octane leaded fuels, as the residues of such fuels have a corrosive effect on engine parts.

In the instance of engines intended for commercial use, such as in farm tractors, trucks, boats and stationary engines where high compression is not essential, it may be highly desirable both from the point of view of fuel economy and reduction in engine maintenance costs to use the heavier hydrocarbon fuels in place of gasoline or similar fuels containing chemical additives. The difficulty in using the heavier hydrocarbons as engine fuels is that frequently these materials are not of uniform characteristics and often require special treatment before use, such as redistillation which is prohibitive in cost except in large installations or when used in Diesel type engines. When Diesel engines can operate on the heavier hydrocarbon fuels, such engines depend primarily on the development of high compression which materially increases maintenance costs and therefore offsetting economies in fuel costs.

It is recognized that some of the lighter petroleum fractions, such as kerosene and No. 1 diesel oil are good engine detergents, and since they are much less expensive than gasoline, would be highly desirable as engine fuels provided their sulfur content is sufficiently low. These heavier fractions have not generally been adopted as fuel for spark fired engines because they do not lend themselves to ordinary cold weather starting, and when used it has heretofore been necessary to provide some arrangement to start the engine on a more volatile fuel such as gasoline or ether, and then transfer to the heavier fuel only after the engine parts are warm.

It has only recently been recognized that some of the so-called "heavier hydrocarbons" have a lower spontaneous ignition temperature (SIT) than the more volatile fuels and will actually ignite at a lower temperature. This is true because the more volatile fuels contain additives which act to prevent pre-ignition of the fuel, thereby raising the spontaneous ignition temperature of these products. When these facts are properly related to the starting of a cold engine with battery power, it will be evident that the heavier hydrocarbons are actually more desirable as fuels. It is known that the strength of a storage battery decreases with a drop in temperature, and that some heat in the form of compression and spark is necessary before the fuel will ignite to start the engine. The present invention is predicated upon the theory that instead of using the diminishing strength of the battery to create a hot spark, and simultaneously crank the cold engine enough to obtain some heat of compression, the power of the battery may be more economically used to pre-heat the fuel-air mixture to a point which is just below the spontaneous ignition temperature, and then use but very little of the battery power for cranking the engine, for when the fuel-air mixture has been pre-heated it will more readily ignite even with a weak spark.

While the foregoing discussion emphasizes the use of heavier hydrocarbons as engine fuel for trucks and other commercial vehicles, trade practices may justify its use for other reasons. An important and growing field in which internal combustion engines are used is to provide prime movers for air conditioning or mechanical refrigeration of transport vehicles, and more particularly the air conditioning of railway passenger cars and the mechanical refrigeration of railway refrigerator cars. At the present time most of the railways use diesel powered locomotives, and having adopted engines that use the heavier hydrocarbons as fuel, they are inclined to look with greater favor on other mobile equipment which uses similar types of fuels.

In some of my prior patents, which include Reissue Patent No. 23,000 and Patent No. 2,477,377, are disclosed continuously operated engines that may be used for providing the motive power for refrigeration equipment. When a continuously operated engine is used the attending problems of engine operation are not great because when once started the engine will maintain a more or less constant temperature, and in such instances cheap fuel such as the heavier hydrocarbons can be used, and the engine could under those conditions be started on gasoline or other highly volatile fuel and then switched over to the cheaper fuel. It is not always practical, nor is it economic to use a continuously operating engine for mechanical refrigeration or other related practices since there will be long periods of time when the refrigeration is not required, and continuous operation under those circumstances merely shortens the life of the engine. In my prior patents, 2,377,164 and 2,696,086, I have disclosed arrangements in which an intermittently operated internal combustion engine is used to provide the motive power for operating refrigerating equipment. When an intermittently operable engine is used, the attending problems are greatly multiplied. In Patent 2,696,086 I have disclosed a mechanically operated railway refrigerator car which is entirely automatic insofar as temperature control of the lading space is concerned. Such a car is intended to be used on long trips where in a single journey the ambient temperature may vary between desert heat and frigid winter conditions. Therefore the mechanical equipment must be capable of alternately heating or cooling the lading space, and more particularly in heating when extremely low ambient temperatures prevail. Under these varying conditions it will be appreciated that reliable automatic starting of the engines, and particularly when they are required to operate with the heavier hydrocarbon fuels presents a difficult problem.

In the present invention I have provided a control device that is adapted for use with a low compression engine for connection between the carburetor or other fuel mixing device and the combustion cylinders, that includes a fuel vaporizing chamber for preheating the air-fuel mixture prior to its introduction into the combustion cylinders. Means are provided for preheating the vaporization chamber prior to the passage of fuel therethrough and in the accompanying drawings I have disclosed an electrical resistance type heater which is capable of initially heating the vaporizing chamber and also of heating fuel flowing therethrough. Since a heater of this type would very likely attain an initial temperature sufficient to cause spontaneous ignition of the fuel coming in contact therewith, it is essential that the chamber temperature be high, but not so high as to cause spontaneous ignition, and therefore arrangements must be made to cut off the flow of electric power to the heater prior to the initial introduction of the fuel, and again permit the passage of current through the heater while the fuel-air mixture is flowing to the engine, and until the heat of exhaust gases may be used to supplant the electrical heater, and thereafter to control the flow of exhaust gases sufficient to maintain a desired temperature, but one which is below the spontaneous ignition temperature of the mixture. To accomplish this, temperature responsive means control the energization of the electrical heater and also the energization of the engine ignition system and the motor used to start or crank the engine, and thereafter to regulate the flow of the heated exhaust gases relative to the vaporization chamber. To simplify the construction of the control means a first temperature responsive control device or thermal motor is provided to properly control the electric circuits, and a second temperature responsive control device or thermal motor is provided to control the flow of the hot exhaust gases in heat exchange relationship with the vaporization chamber. By this arrangement a condition which is ideal both for starting and the subsequent continuous operation of the engine can be provided which will be effective without regard to ambient temperatures, and although applicable to an engine that is designed to operate on heavier hydrocarbons as fuel, it is also capable of use with the more volatile fuels, particularly if the engine is used in areas where the ambient temperature is very low. It will be apparent that this arrangement permits a low compression engine to operate on cheaper fuels and with lower maintenance costs no matter how low the ambient temperature may descend.

An object of the invention is to provide a control device for use with an internal combustion engine and situated between the fuel mixing means and the combustion cylinders embodying a vaporizing chamber to pre-heat the fuel and when the proper amount of heat is obtained for such purposes, to control the energization of the electrical circuits used to start and operate the engine.

Another object is to provide a control device for use with an internal combustion engine and its electrical circuits, including a fuel vaporizing chamber which is electrically heated to a fuel vaporizing temperature prior to starting, together with a temperature responsive control device or thermal motor that controls the flow of current to the vaporizing chamber, and is also capable of controlling the flow of the current to the starting and ignition circuits to start and operate the engine when the vaporizing chamber has been properly pre-heated.

Another object is to provide in combination with a control device for use with an internal combustion engine including fuel preheating means, and a circuit including an electrically actuated time delay means that acts to temporarily de-energize the pre-heating means during the initial introduction of fuel, and which thereafter energizes the engine starting circuit as well as the fuel pre-heating means.

Another object is to provide a control device for use with an internal combustion engine including a fuel vaporizing chamber situated between the fuel mixing means, the combustion cylinders and an exhaust gas manifold for continuously maintaining a fuel-air mixture at the proper temperature for maximum efficiency either by electrical heating of the chamber prior to and during the starting operation or by the heat of exhaust gases during continued engine operation, together with means for properly controlling the respective sources of heat.

Another object is to provide a control device for use with an internal combustion engine and its electrical circuits, combining a fuel vaporizing chamber situated between the fuel-air mixing means and the combustion cylinders including a rapidly heated electrical heating element in heat exchange relationship with a portion of said device capable of rapidly pre-heating the fuel mixture to a vaporizing temperature before starting, together with temperature responsive control means that initially energize the electrical heating element, and then terminates the flow of current therethrough just long enough to permit the element to cool below the ignition temperature of the fuel, for the introduction of the fuel, and thereafter again energize the heating element to continue vaporizing the fuel mixture passing to the combustion chamber in such a manner as to prevent thte condensation of the fuel prior to combustion in the cylinders, and thereafter to direct heated exhaust gases in contact with the vaporization chamber, and as the temperature of the chamber rises as a result of engine operation to cut off the flow of current to the electrical heating means.

A further object is to provide a control device for use with an internal combustion engine to enable the engine to operate on heavier hydrocarbons and start at a low ambient temperature, embodying a fuel vaporizing chamber which is alternately heated by electrical power or exhaust gases, together with a temperature responsive control device or thermal motor that is capable of sequentially controlling the temperature of the vaporizing chamber from the respective sources of heat, and energizing the engine ignition circuit only when conditions are appropriate for the engine to operate on internal combustion of fuel.

Other and further objects may become apparent from the following specification and claims, and in the appended drawings in which:

Fig. 5 is an elevation taken on line 5—5 of Fig. 2;

Figure 9:
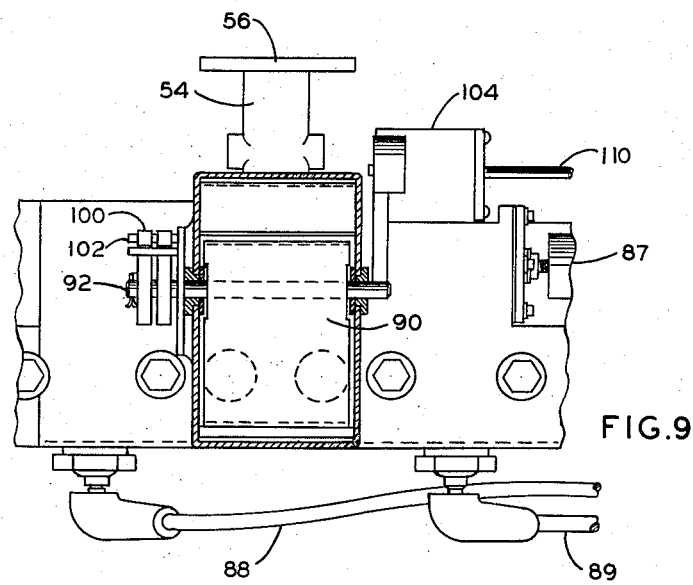
Figure 6:
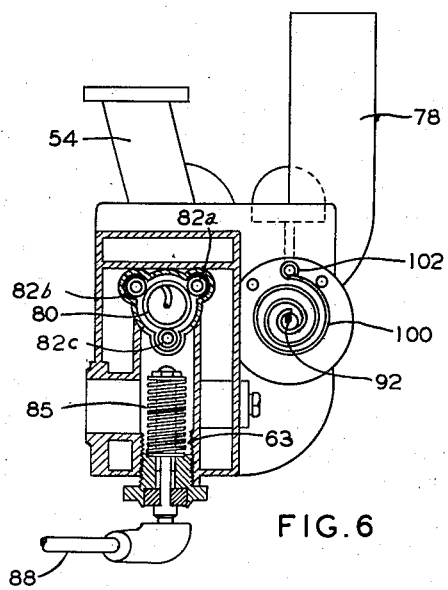
Figure 7:
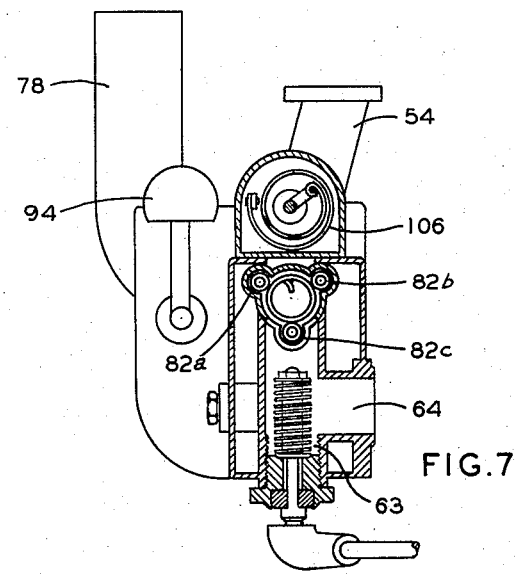
Figure 8:
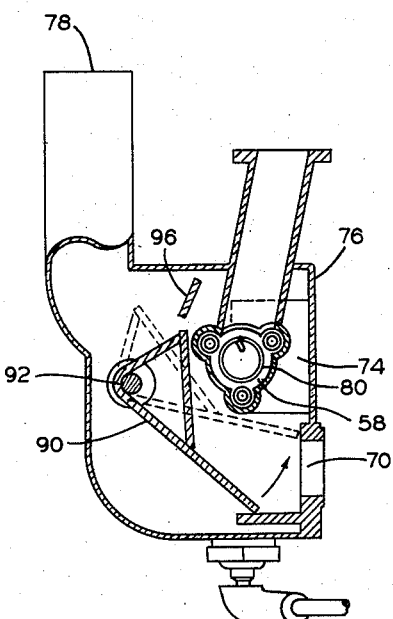
Figure 11:
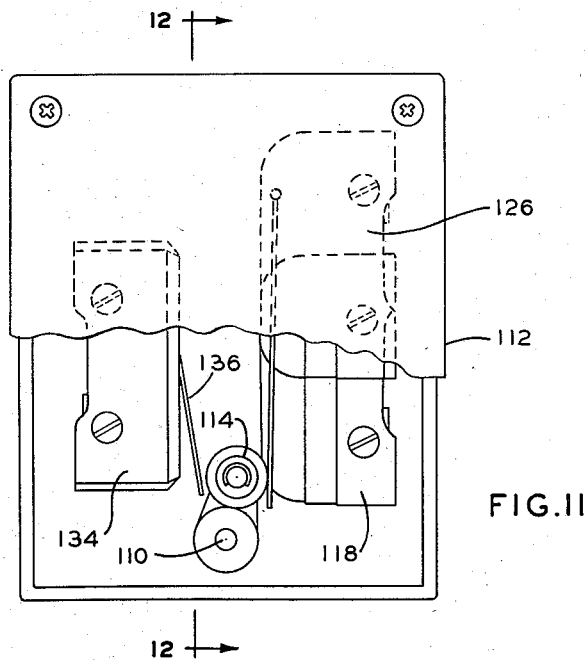
Figure 12:
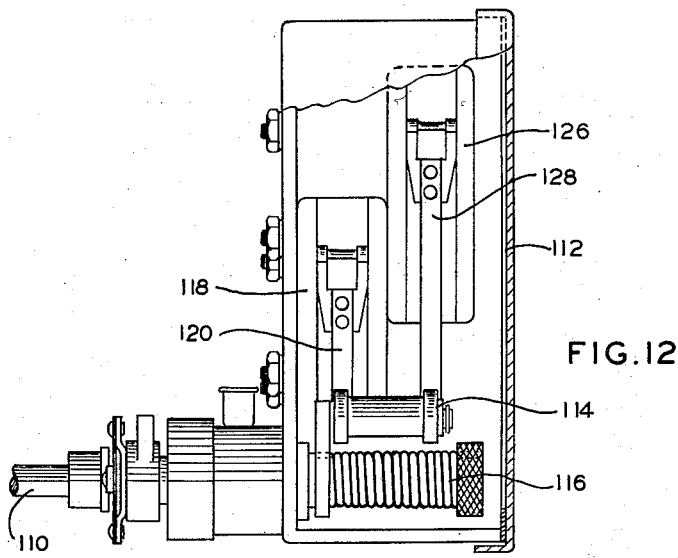
Figure 13:
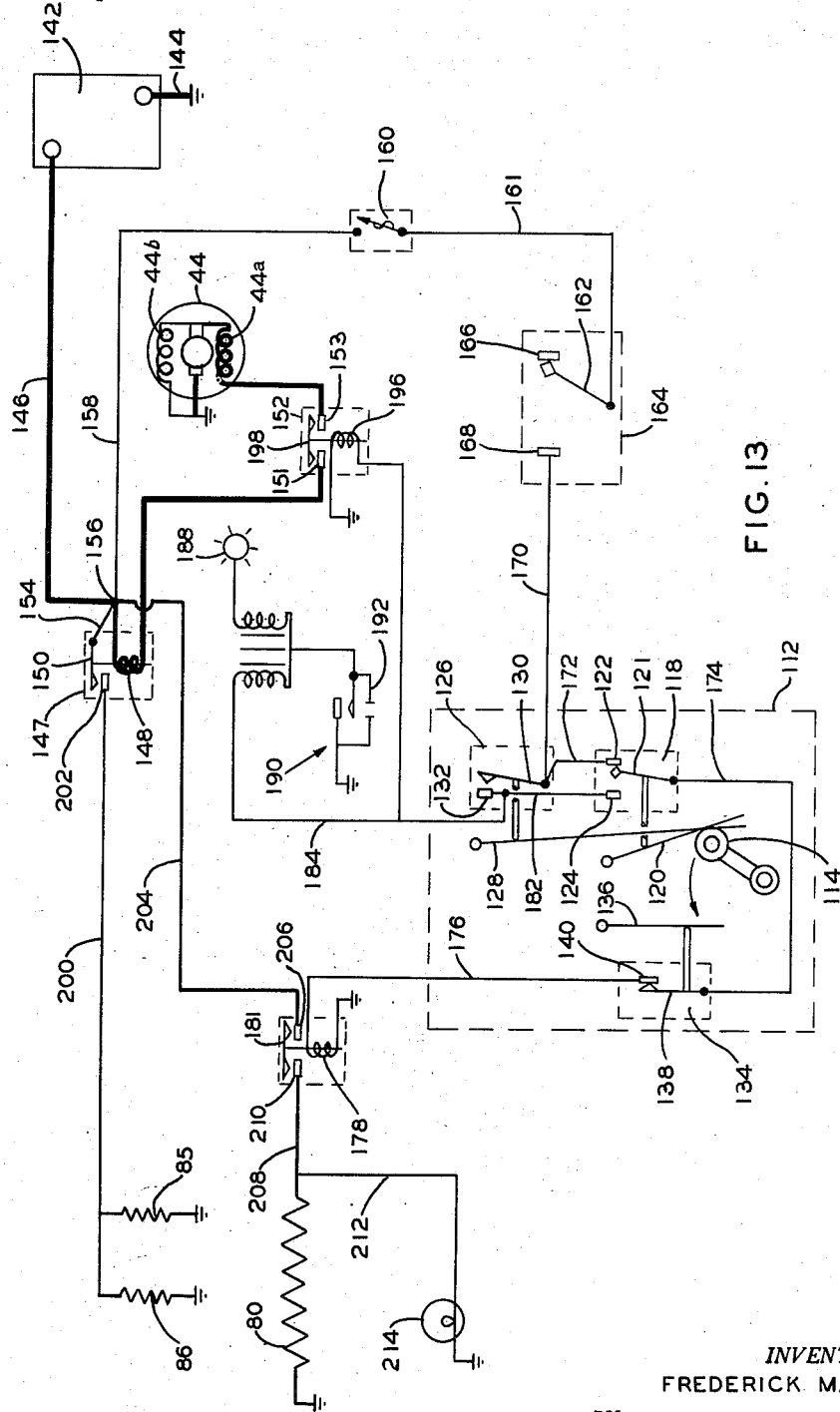
Figure 14:
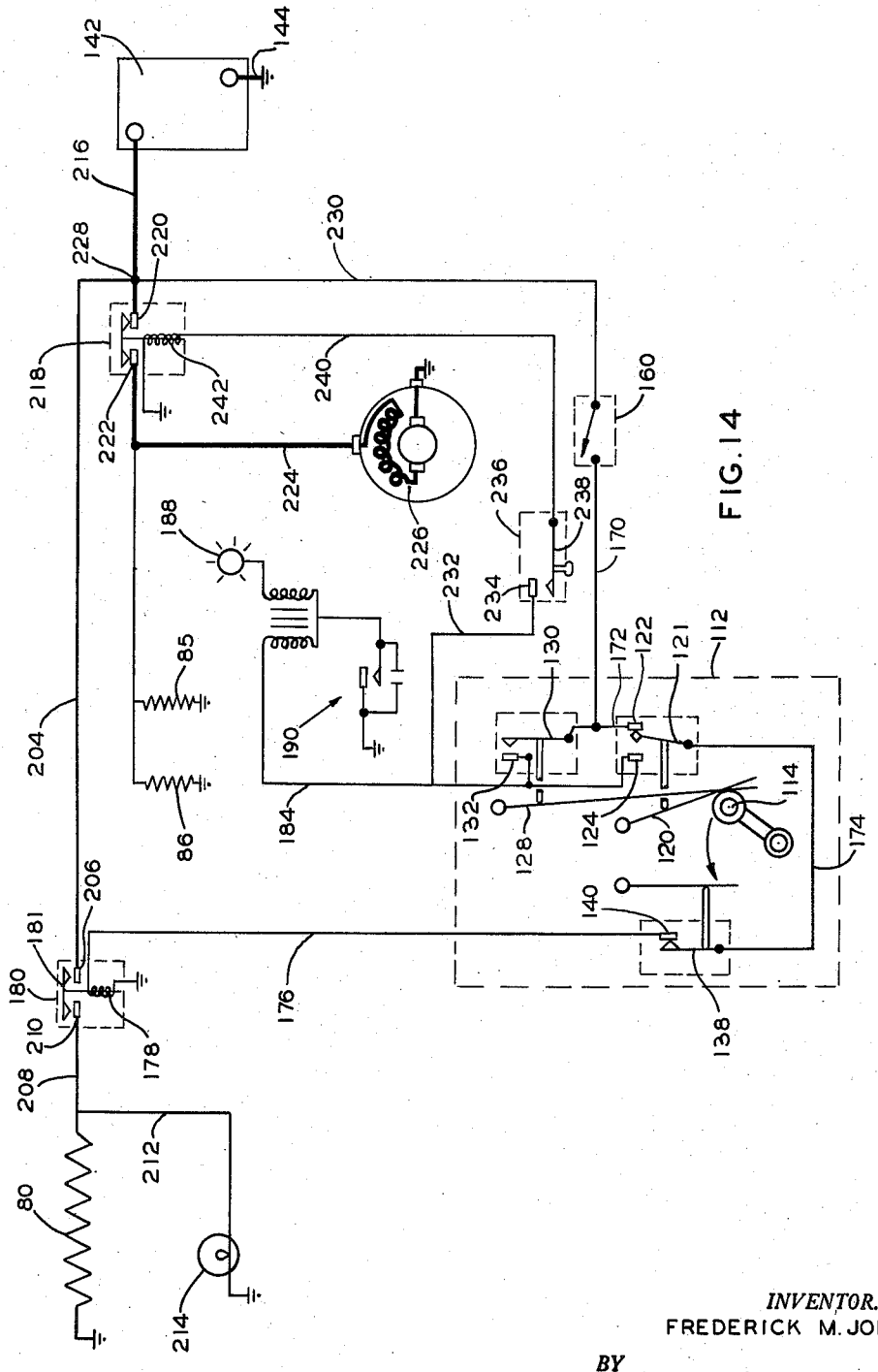
Figure 15:
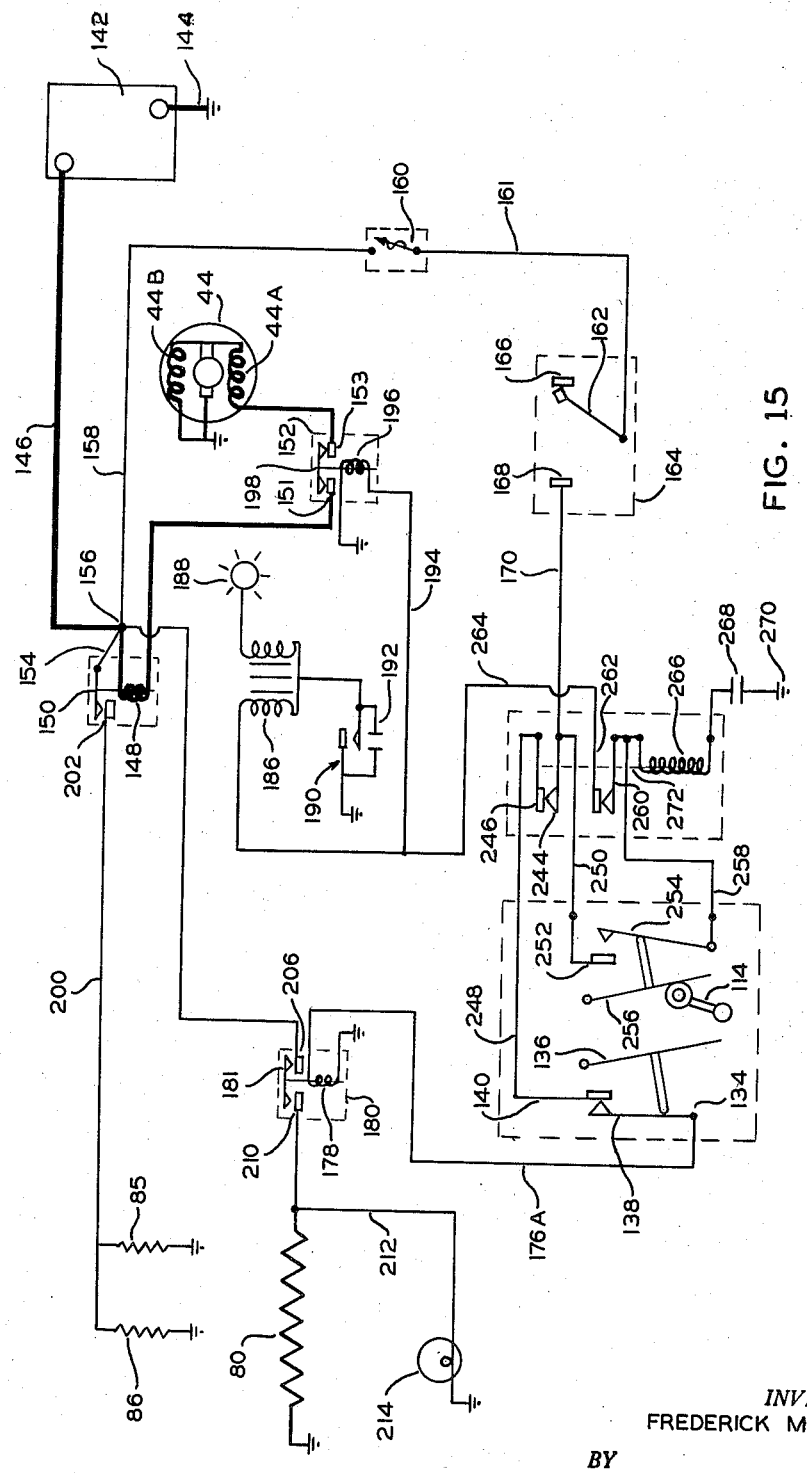

Fig. 6 is a sectional view taken on line 6—6 of Fig. 5;
Fig. 7 is a sectional view taken on line 7—7 of Fig. 5;
Fig. 8 is a sectional view taken on line 8—8 of Fig. 5;
Fig. 9 is an elevation of a portion of the structure shown in Fig. 3;
Fig. 10 is a front elevation of a portion of the structure shown on the right hand side of Fig. 5;
Fig. 11 is an enlargement of the structure shown in Fig. 10;
Fig. 12 is a side elevation of the structure shown in Fig. 11, as seen from the right hand side thereof;
Fig. 13 is a wiring diagram of the circuits used in connection with the invention when used with an automatically started engine in a refrigeration system or the like, and schematically showing other portions of the invention disclosed in Fig. 1;
Fig. 14 is a wiring diagram similar to that of Fig. 13 showing the invention used in combination with a conventional internal combustion engine such as might be used in a motor vehicle or the like; and,
Fig. 15 is a modification of the circuits shown in Figs. 13 and 14.

Referring now to the several figures of the drawings, the invention will be described in detail.

Figure 1:
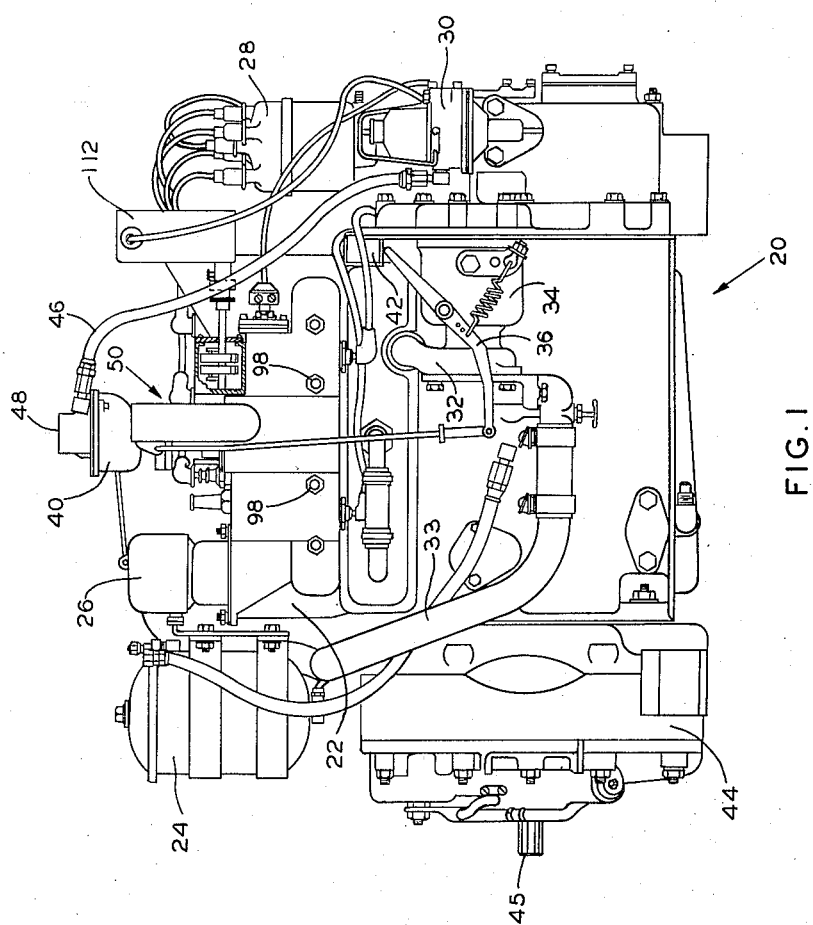
Fig. 1 is a side elevation of an internal combustion engine embodying the present invention and with certain portions broken away to show internal structure.

Referring first to Fig. 1, general reference numeral 20 indicates a complete internal combustion engine consisting of an engine block 22 containing a multiplicity of vertically operating pistons, not shown, of a conventional low compression engine. Other conventional features of the disclosure of Fig. 1 forming parts of an engine include an oil filter 24, an automatic choke 26, an ignition distributor 28, a fuel pump 30, a water pump 32 having a conduit 33 extending to a cooling radiator, not shown. As this engine is used in conjunction with a refrigerating system it is provided with a governor 34 and a governor controlled lever 36 which at one end is connected to the butterfly valve of a carburetor 40 and at its other end to a switch 42, forming a part of a refrigeration compressor control device shown in my prior Patent No. 2,581,956, which issued January 8, 1952. There is also disclosed in Fig. 1 a starter generator 44 embracing a crankshaft fragmentarily shown at 45, and it should be understood that the purpose of the starter generator insofar as this invention is concerned is merely an electrical motor for initially energizing the internal combustion engine.

Carburetor 40 is provided with a fuel inlet conduit 46 extending from the fuel pump 30 and is also provided with an air inlet 48 which may extend to an air heater and/or an air filter, not shown.

Indicated by general reference character 50 is the control device that forms the present invention, which is intended to properly vaporize fuel flowing from carburetor 40 to the combustion cylinders of the engine and for properly controlling the ignition system represented by the distributor 28, and also the engine starting motor indicated by the starter generator 44.

Figure 2:
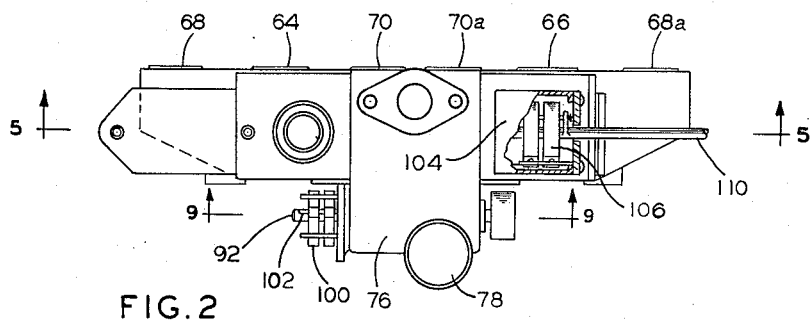
Fig. 2 is a top plan view of the subject matter forming the present invention with parts broken away to show internal structure.
Figure 3:
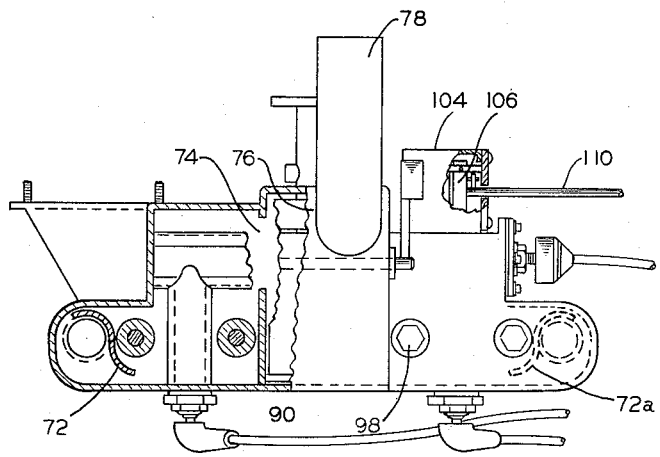
Fig. 3 is an elevational view of the structure shown in Fig. 2 with portions broken away to show internal structure.
Figure 4:
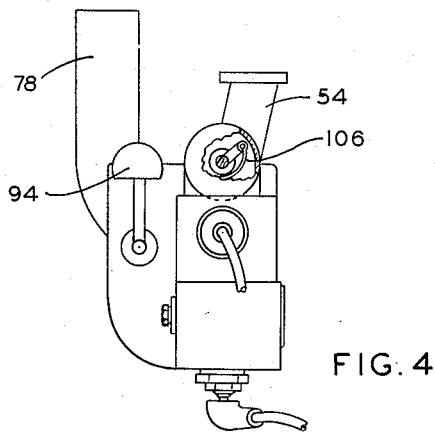
Fig. 4 is an end view of the structure shown in Fig. 3 as seen from the right hand end thereof and with parts broken away to show internal structure.

Referring now to Figs. 2–12, reference character 52 indicates a casing having an upstanding conduit 54 that is connected by means of a flange 56 to the lower extremity of carburetor 40. Conduit 54 joins a horizontal passage 58 within the interior of casing 52, and depending from the opposite ends of conduit 58 are vertical passages 60 and 62 having pockets 63 at the lower ends thereof. As best seen in Fig. 7, each of these latter passages adjacent their lower ends are connected to horizontal passages 64, 66 for conducting a fuel mixture from the carburetor to the intake ports of the engine, it being understood that in a four cylinder engine each of the passages 64, 66 extend to a Y-shaped passage within the interior of the engine block, and thus the fuel mixture passes in equal quantities to each of the several combustion cylinders of the engine. As best seen in Fig. 5, and shown in dotted lines, the casing 52 contains four exhaust gas ports indicated at 68, 68a and 70, 70a which connect with appropriate exhaust gas openings in the engine block 22. As best seen in Fig. 3, baffles 72 and 72a surround portions of the openings 68 and 68a and direct the exhaust gases from the two opposite end openings around the lower ends of passages 60, 62 and then into passages 74 on either side of a central exhaust gas chamber indicated in Figs. 3 and 4 by reference character 76. The central exhaust chamber 76 also surrounds the two central exhaust gas ports 70 and 70a providing direct outlet for the exhaust gases from these passages, and indirect outlet for the exhaust gases from the opening 68 and 68a to an exhaust gas conduit 78. It should be understood that the exhaust gases from the two end ports circumscribe the horizontal fuel inlet passages 64 and 66 to heat the fuel passing therethrough, as will be discussed hereinafter.

As clearly disclosed in Figs. 5–8, within the horizontal passage 58 is mounted a helically wound heater element 80 composed of metal having a high electrical resistance. The element 80, as best seen in Figs. 5 and 6, is supported by three triangularly disposed insulators 82a, 82b and 82c composed of a multiplicity of ceramic disks 84. Within the two vertical passages 60 and 62 are also disposed plug type electrical resistance heaters 85, 86 that extend into the pockets 63. As best seen in Fig. 5, each of these respective heaters are connected to electrical conductors indicated at 87, 88 and 89.

Referring now to Figs. 7 and 8, within the central exhaust gas chamber 76 and situated between the central exhaust gas ports 70 and 70a and the conduit 78 is a damper 90 that is mounted for pivotal movement on a rod 92, and which is counterbalanced by a weight 94 for by-passing a portion of the exhaust gases from the central inlet openings 70 and 70a. A baffle 96 is mounted within this chamber and cooperate with damper 90 in causing the exhaust gases to circulate about the outer limits of passage 58.

As seen in Figs. 2, 3 and 9, a thermal motor composed of coiled bimetal 100 is situated at one side of the central exhaust gas chamber 76. This coil has one end secured to a stationary rod 102 and its other end secured to rod 92 so as to be capable of rotating the exhaust gas damper 90 relative to the central exhaust gas ports 70 and 70a.

Casing 52 is mounted on the engine block 22 in heat transfer relationship thereto between the carburetor and the several ports of the engine, and is supported by a plurality of securing studs 98.

As best seen in Fig. 5, on the upper portion of the casing 52 and at the right of the inlet conduit 54 is a metallic housing 104 that is in heat exchange relationship with casing 52 and contains another thermal motor composed of a bimetallic element indicated at 106 which is secured at one end to a stationary rod 108 and at its other end to a rotatable rod 110 that is journalled within housing 104.

As best seen in Figs. 5 and 12, the outer end of rod 110 extends into a switch casing 112 and carries an eccentrically mounted switch actuator 114. The outer end of rod 110 also carries an overrun mechanism indicated at 116 which is intended to absorb rotative movement of the rod 110 after it has performed its necessary switch actuating function which is to be described hereinafter.

Referring now to Figs. 10–13, within casing 112 and positioned to be actuated by member 114 are three switches. The first of these switches designated at 118 is provided with an actuator 120 that is in the line of movement of the actuator 114. A switch blade 121 is adapted to move between contacts 122, 124 within switch 118. A second switch designated at 126 is provided with an actuator 128 that is adapted to move a switch blade 130 relative to a contact 132. The third switch designated at 134 is provided with an actuator 136 that is adapted to move a switch blade 138 relative to a contact 140.

Referring now to Fig. 13, parts of the mechanism heretofore described are connected in one or more electrical circuits for their proper operation in conjunction with a refrigeration system or the like. A source of power shown as a storage battery 142 is provided with a ground connection 144. Extending from the positive pole of battery 142 is a heavy conductor 146 that extends to a relay designated at 147. Relay 147 consists of an armature 150, and an induction coil 148 composed of only two turns so as to have an inductive effect only when considerable current is flowing therethrough. Conductor 146 extends from coil 148 to a contact 151 on one side of a relay 152 and thence from a contact 153 to the starting winding 44a of the starter generator designated at 44, which is also provided with a generator winding 44b. A branch conductor 154 extends from a junction 156 on conductor 146 to the armature 150 of relay 147. A conductor 158 extends from junction 156 to a manually closable switch 160, and from the switch 160 conductor 161 extends to a switch blade 162 of a thermostat designated at 164. The thermostat is responsive to the temperature of a space to be conditioned and is provided with contacts 166, 168 that are adapted to be alternately engaged by the switch blade 162. Extending from contact 168 is a conductor 170 which joins the switch blade 130 of switch 126, and from switch blade 130 a short conductor 172 extends to contact 122 of switch 118. From switch blade 121 a conductor 174 extends to switch blade 138 of switch 134, and a conductor 176 extends from contact 140 to a coil 178 of a relay 180 containing an armature 181. A short conductor 182 joins contact 124 of switch 118 and contact 132 of switch 126. From conductor 182 a second conductor 184 extends to the primary side of a transformer designated as 186 whose secondary winding extends to the spark-plugs of the internal combustion engine, said plugs being designated collectively at 188. Connected to the transformer 186 is a switch 190 which in fact is the engine distributor timing points, and cooperative with switch 190 is an ignition condenser designated at 192. Extending from the conductor 184 is a conductor 194 which includes a relay coil 196 of relay 152, and cooperative with coil 196 is an armature 198 having contacts that engage with contacts 151, 153 forming part of the power circuit of conductor 146. Another power conductor 200 extends from a contact 202 of relay 147 to the plug heaters 85 and 86, and thence to ground. Another power conductor 204 extends from the junction 156 on conductor 146 to a contact 206 of relay 180. Another conductor 208 extends from a contact 210 of relay 180 to the coil heater 80, and thence to ground. A branch conductor 212 extends from conductor 208 to a signal lamp 214 and thence to ground.

Having reference to the several figures of the drawing in conjunction with Fig. 13, the operation of the invention will be explained in conjunction with starting an internal combustion engine provided with a starter generator for operating a refrigeration system such as might exist in a transport vehicle, in which a call for refrigeration by thermostat 164 will energize the system of Fig. 13 to start operation of engine 20. Assuming that the manual switch 160 is closed and that switch 162 of the thermostat 164 is in engagement with contact 168, a power circuit for the energization of heater 80 will be established which may be traced as follows: From battery 142 current will flow through the conductor 146 to junction 156 and thence through conductor 158, switch 160, thermostat switch 162, contact 168, conductor 170, branch 172, contact 122, switch 121, conductor 174, switch blade 138, contact 140, conductor 176, and coil 178 of relay 180 and thence to ground. With the energization of coil 178 the armature 181 will be brought into engagement with contacts 206, 210 and then power will flow from conductor 146 at the junction 156 through conductors 204 and 208 to coil 80 and thence to ground. Coincidental with the energization of coil 80, the lamp 214 will be illuminated. As power flows through the coil 80, its resistance will cause the same to heat, and the heat is radiated to those portions of casing 52 and passage 58 that surround the coil 80 and eventually to the thermal motor or bimetal control device 106, which when heated rotates the rod 110 causing the actuator 114 to move in a counterclockwise direction, as seen in Fig. 13, moving away from the actuator 120 and permitting the switch blade 121 to move from contact 122 to contact 124. When this occurs, the circuit between conductors 172, 174 is broken, and thereby de-energizing the relay coil 178 to de-energize heater 80 and the signal lamp 214. However, the heat emanating from coil 80 prior to its de-energization will have been sufficient to cause a continued rotation of the bimetal 106 and shortly thereafter the actuator 114 continuing to move in a counterclockwise direction, moves away from the switch actuator 128 permitting switch blade 130 to move into engagement with contact 132. The actual time lag in which this action takes place is predetermined to assure that heater 80 will be at a temperature lower than the spontaneous ignition temperature of the fuel, which in practice is about nine seconds, being sufficient for heater 80 to cool below an incandescent condition so that when a fuel-air mixture is brought into contact therewith, the latter will not ignite in the passage 58, but will nevertheless be initially heated to a vaporizing temperature by the residual heat in coil 80 and the metal forming the walls of passage 58. With the closing of switch 136, a slightly modified circuit is established which may be traced from the thermostat 164, it being assumed that switch blade 162 is still in engagement with contact 168 and that current is flowing from the battery to this point. From the conductor 170 current flows through switch blade 130, contact 132, short conductor 182, contact 124, switch blade 121, conductor 174, switch blade 138, contact 140 and conductor 176 and coil 178 to ground, to re-energize the heater 80 and signal lamp 214, and coincident therewith current also flows from the short conductor 182 through the conductor 184 to the ignition system represented by transformer 186, and timer points 190 to the several sparkplugs designated as 188 to energize the ignition circuit. Current also flows from conductor 184 through the branch 194 to the coil 196 of relay 152, thereby closing the armature 198 with respect to contacts 151, 153 to close a circuit from the battery 142 to the starter generator 44. With the closing of armature 198, a high amperage current flows from the battery 142 through the heavy line conductor 146 to the starting winding 44a of the starter generator 44 causing the armature 150 of relay 147 to close with respect to contact 202 to supply current through conductor 200 to the plug heaters 85, 86 at the same time. When the engine becomes self-operating the flow of high amperage current ceases, and a lower amperage current from the generator coil 44b flows back through the same connections to the battery, but this weaker current flowing through the double turn of coil 148 is not sufficient to hold armature 150 in a closed position. Therefore when the engine is started relay 147 opens to de-energize the plug heaters 85, 86. Considering now the operation of control device 50, when the starter generator 44 is energized it will cause cranking of the engine and movement of the several pistons with respect to their several cylinders causing an air-fuel mixture to be drawn from the carburetor 40 through the passage 54 of the control device 50 into the horizontal passage 58 whence the fuel mixture passing through and about coil 80 and then divides to the passages 60 and 62 passing about the plug heaters 85, 86 and through the horizontal passages 64, 66 to the combustion cylinders of the engine in a fully vaporized condition, where it will be readily ignited by the sparkplugs 188.

As some of the fuel may not be in a fully vaporized condition, it will not necessarily flow through the horizontal passages 64, 66, but will become entrapped in the pockets 63. During the starting operation the plug heaters 85, 86 will be capable of volatilizing any material that is deposited in the pockets 63, and during continued operation of the engine after the plug heaters 85, 86 are de-energized, the exhaust gases from ports 68 and 68a flow about the outer sides of these pockets and thus will heat any of the heavier fractions within the pockets to a vaporizing temperature.

When a heavier hydrocarbon such as kerosene is used as fuel, the thermal motor 106 is composed and arranged to operate on a minimum temperature of about 350° F., for by experiment it has been found that this temperature is sufficient to assure vaporization of fuel of this character. Of course the thermal motor can be arranged to operate on different temperature ranges in the event that other forms of fuel are utilized, and to this extent the invention can be used with any type of fluid fuel to assure prompt starting in cold weather. The housing 104 which surrounds the bimetal is intended to prevent cold ambient air such as might emanate from an engine cooling fan or the like, from too quickly cooling the bimetal since it is essential that this element initially break the circuit to heater 80, but only long enough so that the latter element may cool down below an incandescent temperature, and thereafter again energize the heater 80 at the same time that the ignition and starting circuits are energized. When the engine is self-operating, the exhaust gases flowing from the several combustion cylinders flows through the several ports of casing 52 forming the exhaust gas passages. As the engine continues to operate on its own power, the heat of the exhaust gases will be transmitted to the second thermal motor being bimetal 100, which is connected through the rod 92 to the damper 90 that controls the flow of exhaust gases from the two central ports 70 and 70a. Initially the exhaust gases from these ports as well as the two opposite end ports 68 and 68a flow about the passages 58, 64 and 66 and pockets 63 so as to aid in preheating the in-coming fuel mixture. But as the temperature of the exhaust gases increases, it might overheat the fuel mixture, and therefore the damper 90 under the influence of thermal motor 100 moves to by-pass the exhaust gases from the central ports 70 and 70a from contact with passage 58 permitting the gases from these ports to go directly to the exhaust gas pipe 78. However, the exhaust gases from passages 68 and 68a will always come into contact with passages 58, 60, 62, 64, and 66 and pockets 63 so as to pre-heat the in-coming fuel mixture. Now, as the heat of the exhaust gases affects the bimetal 106, it continues in its counter-current rotation until the actuator 114 is brought into engagement with switch actuator 136, whence switch blade 138 will move away from contact 140, thereby breaking the circuit to the coil 178 of relay 180 and de-energizing heater 80. It will be apparent that when exhaust gases are capable of heating the in-coming fuel mixture it will then no longer be necessary to rely on the interior heat supplied by heater 80 and since the plug heaters are already de-energized the fuel is heated by the exhaust gases only. The engine will then operate until through the cooling effect of the refrigerating system operated by the engine, the temperature within the controlled space has descended to a point where the thermostat switch blade 162 moves away from contact 168 and into engagement with contact 166. Opening of the thermostat switch completely de-energizes the system causing the engine to shut down, and de-energizing any other portions of the circuit. Thereafter, as the engine cools, the bimetal 106 will rotate the actuator 114 in a clockwise direction and eventually move switch actuators 120, 128 and 136 to the position shown in Fig. 13, whence the circuit is ready for re-energization in the manner described hereinbefore.

Referring now to Fig. 14 is disclosed a modified circuit applicable to starting an ordinary truck engine that is provided with a conventional starting motor, and a conventional starting switch in place of the starter generator and condition responsive switch disclosed in Fig. 13. Many of the same parts disclosed in Fig. 14 also appear in Fig. 13, and in those instances the same reference numerals are used to designate similar parts. Commencing from the battery 142, a heavy conductor 216 extends to a relay 218 and joins a contact 220 thereof. From a contact 222 a heavy conductor 224 extends to a conventional starting motor indicated at 226. Extending from a junction 228 on conductor 216 a conductor 230 extends to a manual switch 160, and a conductor indicater at 170 extends to switch blade 130. The description relative to the parts and operation of the various switches within switch casing 112 are the same as heretofore described, as is equally true of the ignition system. A conductor 232 extends from conductor 184 to a contact 234 of a conventional engine starting switch indicated at 236 having a movable switch blade 238 that is adapted to engage contact 234. A conductor 240 extends from blade 238 to a coil 242 of relay 218 and thence to ground.

Having an understanding of the circuit and mode of operation previously described in conjunction with Fig. 13, the present circuit is relatively similar. When the engine in question is to be started, the manual switch 160 is closed, thereby establishing a circuit between battery 142 and heater 80 and its signal lamp 214, which may be traced as follows: Conductor 216 to junction 228 and thence conductor 230, switch 160, conductor 170, conductor 172, contact 122, switch blade 121, conductor 174, switch blade 138, contact 140, conductor 176 through coil 178 to ground, thereby energizing coil 178 of relay 180, whence current will flow from the junction 228, conductor 204, contact 206, armature 181, contact 210, conductor 208, to heater 80 and signal 214. As heater 80 generates heat the thermal motor 106 will rotate rod 110 and actuator 114 to move switch blade 121 into engagement with contact 124, thereby de-energizing heater 80 and signal 214. As explained heretofore, there is a lapse of time, preferably 9 to 10 seconds, whereupon the residual heat of heater 80 causes a continuing movement of actuator 114, moving the same away from blade 128 to permit closing switch 130 with respect to contact 132 to re-establish the heating circuit and establish the ignition circuit as heretofore explained. The advantage in having the signal lamp 214 will now become apparent since it is essential that this signal be de-energized and again re-energized before the ignition and starting circuits are operative. Upon re-energization of heater 80, as indicated by the signal 214, the starting switch 236 may be operated by closing switch blade 238 with respect to contact 234 whence relay 218 is energized to energize the starting motor 226. As soon as the engine is started by the starting motor 226, the manual starting switch 238 may be released, which will de-energize relay 218, and the plug heaters 85, 86 which are energized simultaneously with the starting motor 226.

Referring now to Fig. 15, is disclosed a modified form of circuit which may take the place of the circuits shown in Figs. 13 and 14. In this figure many portions of the circuit are identical with that disclosed in Fig. 13 and therefore it is not deemed necessary to repeat reference to elements heretofore disclosed. As here shown, the conductor 170 extends to a relay contact 244 that normally engages a contact 246. A conductor 248 extends from contact 246 to contact 140 that normally engages switch blade 138 of switch 134. A conductor 176a joins switch blade 138 with the induction coil 178 of relay 180. Extending from relay contact 244, a conductor 250 extends to a contact 252 that is adapted for engagement with switch blade 254. Switch blade 254 is normally held in an open circuit relationship with contact 252 by a switch actuator 256. A conductor 258 extends from switch blade 254 to relay contact 260 that normally engages contact 262. A conductor 264 extends from contact 262 to the ignition transformer 186, and the conductor 194 that is adapted to energize the starting relay coil 196. Conductor 258 is also connected to a relay coil 266 which in turn is connected to a condenser 268, said condenser being connected to ground as indicated at 270. A relay armature 272 extends through the induction coil 266 and is operably connected to the normally closed relay contacts 260 and 244.

The operation of the system disclosed in Fig. 15 will now be explained. Assuming switch 160 to be closed and thermostat blade 162 to be in engagement with contact 168, direct current will flow from battery 142 in the manner heretofore disclosed to conductor 170 and thence through contact 246 and conductor 248 to switch 134 and thence through conductor 176a to the coil 178 of relay 180, which when closed allows current to flow from battery 142 to the large heater 80. As the thermal motor 106 begins to react to the rise in temperature emanating from the heater coil 80, the actuator 114 will move in a counterclockwise direction away from switch actuator 256, thereby allowing switch blade 254 to engage contact 252. When this occurs current will also flow from conductor 170 through conductor 250, contact 252, blade 254 and conductor 258 to the relay coil 266 and to the condenser 268 and ground 270, to energize the relay. The current flowing from the battery 142 is direct current and will not normally bridge the plates of condenser 268, but the sudden impulse of current will gap the plates to ground. The condenser 268 acts as a time delay mechanism for maintaining the relay coil 266 energized for a predetermined period of time in which heater 80 is allowed to cool below the ignition temperature of the fuel. The capacity of the condenser 268 is carefully related to the resistance of the coil 266 of the relay to provide a definite time relationship of about 9–10 seconds in which the reluctance of the condenser builds up to a point where current ceases to flow through coil 266, whereby said coil can no longer hold the armature in against the pressure of a spring, not shown, acting to free the armature from the coil. Thus the armature is released when the reluctance of the condenser reaches a point where the flow of current through the coil is negligible. With the foregoing description, when the coil 266 is energized, armature 272 will move downwardly opening relay contacts 244 and 260 and terminating the flow of current to heater 80. The purpose of this action is merely to permit heater 80 to cool sufficient to prevent spontaneous combustion of the fuel flowing thereover, and when this condition exists, through the time delay means, armature 272 will return to its inactive position to close relay switches 244, 262, permitting current to flow through conductors 248 and 176a to again energize heater 80 and also permitting current to flow through conductor 264 and 194 to energize the starting mechanism and the ignition means for proper operation of the engine. Thereafter, and in the manner previously disclosed, actuator 114 will rotate counterclockwise to engage switch blade 138 to de-energize the holding circuit for heater 80, and the system will operate in the manner described in conjunction with the operation of Fig. 13.

The principal advantage of the present invention resides in providing a means of starting an internal combustion engine without undue strain on the battery and with any type of fuel when ambient temperatures are very low.

Another advantage is in the provision of means for easily starting an internal combustion engine which utilizes heavier hydrocarbons as fuel.

A further advantage resides in assuring prompt starting and economic operation of a low compression engine that is controlled by an automatic system such as must be used in conjunction with intermittently operated refrigerating systems intended to maintain a constant temperature within a controlled space.

As numerous changes may be apparent to those skilled in the art, the invention is not restricted to the exact construction shown and described heretofore, but is defined in the terms of the appended claims.

I claim:

1. A control device for use with an internal combustion engine and its ignition means, comprising a member containing a passage for fuel-air mixture, an electrical heating element operatively associated with said member for heating a portion of said member and said passage, a circuit including a source of power, said heating element and said ignition means, switch means in said circuit to control said heating element and said ignition means and temperature responsive means operatively associated with said switch means and responsive to a temperature change in a portion of said member for energizing said heating element to heat the passage and thereafter energize the ignition means when a predetermined temperature has been attained by said member.

2. A control device for use with an internal combustion engine including fuel mixing means and the engine ignition means comprising a member containing a fuel mixture delivery conduit for connection between the fuel mixing means and the combustion cylinders of the engine, a heating element operatively associated with said member for heating said member and the fuel mixture flowing therethrough to a relatively high temperature, a circuit including said heating element and the ignition means, sequentially operable control means in said circuit including a normally closed switch controlling said heating element, and initially opened switch controlling at least said ignition means, and a thermal motor operatively associated with said control means and responsive to a temperature change in said member and movable relative to at least one of said switches to initially break the circuit to said heating element and thereafter to simultaneously remake the circuit to said heating element and said ignitioin means.

3. A control device for use with an internal combustion engine including fuel mixing means and the engine ignition means, comprising a member containing a fuel mixture delivery conduit for connection between the fuel mixing means and the combustion cylinders of the engine, a heating element operatively associated with said member for heating said member and the fuel mixture flowing therethrough to a relatively high temperature, a circuit including said heating element and said ignition means, control means in said circuit comprising a first normally closed switch controlling said heating element, an initially opened switch controlling at least said ignition means, a second normally closed switch also controlling said heating element, and a thermal motor responsive to a temperature change in a portion of said member and movable relative to at least two of said switches and adapted to move relative to the initially opened switch on an initial change in temperature of said member, and thereafter to move relative to the second normally closed switch to open the same on a further rise in temperature of said member.

4. A control device for use with an internal combustion engine including a fuel mixing means, the engine ignition means and an electrically operated starting motor adapted to initially energize the engine, comprising a member containing a fuel mixture delivery conduit extending between the fuel mixing means and the combustion cylinders of the engine, an electrical heating element associated with said member for heating a portion of the delivery conduit to a relatively high temperature, circuit means including a source of power, said heating element, the ignition means and said starting motor, normally closed switch means in said circuit to initially energize said heating element to preheat the delivery conduit, normally open switch means in said circuit to re-energize said heating element and also energize said ignition means and said starting motor and a thermal motor operatively associated with said switch means and responsive to an initial temperature rise of a portion of said delivery conduit and adapted to de-energize said heating element and thereafter on a further rise in temperature of said member to re-energize said heating element and simultaneously energize the engine ignition means and the starting motor.

5. A control device for use with an internal combustion engine and its ignition means, comprising a member containing a fuel passage, an electrical heating element operatively associated with said member for heating a portion of said member and said passage to vaporize fuel passing therethrough, a circuit including a source of power, said heating element and said ignition means, means in said circuit to initially energize said heating element to pre-heat said member, a thermal motor operatively associated with said circuit means and responsive to the temperature of a portion of said member for de-energizing said heating element and thereafter simultaneously energizing said heating element and the ignition means to initiate engine operation and thereafter de-energizing said heating element when a predetermined temperature has been attained by said member, said member containing an exhaust gas passage which is in heat exchange relationship with the fuel passage, a damper in the exhaust gas passage for controlling the flow of exhaust gases relative to the fuel passage, and a second thermal motor connected to said damper and responsive to the temperature of a portion of said member for controlling the proportion of exhaust gases that pass in heat exchange relationship with the fuel passage to maintain the fuel in a vaporized condition after the electrical heating element is de-energized.

6. In combination with an internal combustion engine including a fuel mixing means, a control device including a fuel mixture delivery conduit connected between the fuel mixing means and the combustion cylinders of the engine, a first means of applying heat to a portion of the delivery conduit to elevate the temperature therein to the vicinity of a fuel vaporizing temperature, a second means of applying heat to a portion of the delivery conduit to maintain the temperature therein at a fuel vaporizing temperature, and means responsive to the temperature of a portion of said conduit for controlling said first and second heat applying means.

7. In a device of the class described, in combination, a casing containing a fuel passage, a first electrical heating element in said passage and disposed between its opposite ends, a second electrical heating element in said passage and disposed adjacent one end of the passage, a circuit including a source of power and said first and second heating elements, a normally closed switch in said circuit controlling said first heating element, an initially opened switch in said circuit controlling said first and second heating elements, and a thermal motor responsive to a temperature change in a portion of said casing and movable relative to at least one of said switches to break the circuit to said first heating element on an initial change in the temperature of said casing and thereafter to simultaneously energize the circuit to both of said heating elements on a further rise in temperature of said casing.

8. In a device of the class described, in combination, a casing containing a fuel passage, an entrapment pocket disposed in said passage adjacent one end thereof, a first electrical heating element in said passage between its opposite ends, a second electrical heating element disposed in said entrapment pocket, a circuit including said first and second heating elements, a first normally closed switch in said circuit controlling said first heating element and initially open switch in said circuit which when closed energizes both of said heating elements, a second normally closed switch in said circuit which when opened de-energizes both of said heating elements, and a thermal motor responsive to the temperature of said casing and adapted for movement relative to at least two of said switches on a continued rise of temperature of said casing to sequentially de-energize said first heating element, then energize both of said heating elements and thereafter de-energize both of said heating elements.

9. In a device of the class described, in combination, a casing containing a fuel passage, an electrical heating element in said passage, said casing containing an exhaust gas passage which is separate from the fuel passage but which is in heat exchange relationship therewith, a damper in said exhaust gas passage which is capable of by-passing a portion of the exhaust gases relative to the fuel passage, a circuit including a source of power and said heating element, switch means in said circuit, and thermal motor means carried by the casing and responsive to the temperature thereof and operatively associated with said switch means and said damper to de-energize and energize the heating element in timed sequence and thereafter control the position of the damper in the exhaust gas passage.

10. In a device of the class described, in combination, a casing containing a fuel passage, an entrapment pocket disposed in said passage adjacent one end thereof, a first electrical heating element in said passage between its opposite ends, a second electrical heating element disposed in said entrapment pocket, said casing containing an exhaust gas passage which is separate from the fuel passage but which is in heat exchange relationship with said passage and said pocket, a damper in said exhaust gas passage which is capable of by-passing a portion of the exhaust gases relative to the fuel passage, a circuit including a source of power and said first and second heating elements, switch means in said circuit controlling said heating elements, a first thermal motor anchored on said casing and responsive to the temperature thereof and operatively associated with said switch means in such a manner as to de-energize said first heating element and sequentially simultaneously energize said first and second heating elements and thereafter de-energize both of said heating elements, and a second thermal motor anchored on the casing and responsive to the temperature thereof and operatively connected to said damper to by-pass exhaust gases when both of said heating elements are de-energized by said first thermal motor.

11. A control device for use with an internal combustion engine and its ignition means, comprising a member containing a fuel passage and an exhaust gas passage which is separate from the fuel passage, an electrical heating element operatively associated with said member for heating the fuel passage and a portion of said member, a circuit including a source of power, said heating element and said ignition means, a first switch in said circuit which when closed energizes the heating element, a two pole switch in said circuit which when moved between its opposite poles in timed sequence de-energizes and thereafter re-energizes said heating element, a third switch in said circuit operatively associated with the ignition means, and a thermal motor responsive to the temperature of a portion of said member and being effective to move said two pole switch to its second position and simultaneously actuate said third switch to energize the ignition means.

12. A control device for use with an internal combustion engine and its ignition means, comprising a member containing a fuel passage and an exhaust gas passage which is separate from the fuel passage, an electrical heating element operatively associated with said member for heating the fuel passage and a portion of said member, a circuit including a source of power, said heating element and said ignition means, a first switch in said circuit operatively associated with said heating element, a second switch in said circuit operatively associated with the ignition means, a third switch in said circuit which is adapted to render the first of said aforesaid switches ineffective, and a thermal motor operatively associated with said switches and responsive to the temperature of a portion of said member to initially actuate said first and second switches in response to the temperature generated by said heating element and thereafter actuate the third switch in response to the temperature of gases passing through the exhaust gas passage.

13. A control device for use with an internal combustion engine, its ignition means and a starting motor, comprising a member containing a fuel passage, an electrical heating element operatively associated with said member for heating said passage and a portion of said member, a circuit including a source of power, said heating element, said ignition means and said starting motor, a first switch in said circuit operatively associated wth said heating element, a second switch in said circuit operatively associated with the ignition means and the starting motor, and a thermal motor responsive to the temperature of a portion of said member and operatively associated with said switches in such a manner as to break and remake the circuit through said first switch and thereafter actuate the second switch to energize the circuits to the ignition means and the starting motor.

14. A control device for use with an internal combustion engine, including a member containing a fuel passage, a heating element operatively associated with said member for heating a portion of said member and said passage, a circuit comprising said heating element, a first switch in said circuit controlling the activation of said heating element, time delay means operatively connected to said switch for temporarily opening the same and thereafter permitting it to reclose, a second switch in said circuit that controls said time delay means, and control means responsive to the temperature of a portion of said member for actuating said second switch.

15. A control device for use with an internal combustion engine and its ignition means, including a member containing a fuel passage, a heating element operatively associated with said member for heating a portion of said member and said passage, a circuit comprising said heating element and said ignition means, a first switch in said circuit controlling the activation of said heating element, a second switch in said circuit controlling the activation of said ignition means, time delay means operatively connected to said first and second switches for temporarily opening said switches and thereafter permitting the same to reclose, a third switch in said circuit operatively connected to said second switch and said time delay means, and control means responsive to the temperature of a portion of said member for actuating said third switch.

16. A control device for use with an internal combustion engine, including a member containing a fuel passage, a heating element operatively associated with said member for heating a portion of said member and said passage, a circuit comprising said heating element, a first switch in said circuit controlling the activation of said heating element, a relay operatively connected to said switch for moving the same to an inactive position, a second switch in said circuit connected to said relay for energizing the same, a reluctance connected in series with said relay forming a time delay and permitting the relay to reactivate said first switch after a predetermined period of time, and control means responsive to the temperature of a portion of said member for actuating said second switch.

References Cited in the file of this patent

UNITED STATES PATENTS

| | | |
|---|---|---|
| 1,937,042 | Kercher | Nov. 28, 1933 |
| 2,437,262 | Levitt et al. | Mar. 9, 1948 |
| 2,544,544 | Qualley et al. | Mar. 6, 1951 |